United States Patent
Dille et al.

(10) Patent No.: US 12,547,770 B2
(45) Date of Patent: Feb. 10, 2026

(54) METHOD FOR ANONYMIZING VIDEO DATA

(71) Applicant: DEO N.V., Genk (BE)

(72) Inventors: Jeroen Willem Rita Dille, Genk (BE); Niels Festjens, Genk (BE)

(73) Assignee: DEO N.V., Beringen (BE)

( * ) Notice: Subject to any disclaimer, the term of this patent is extended or adjusted under 35 U.S.C. 154(b) by 201 days.

(21) Appl. No.: 18/270,942

(22) PCT Filed: Feb. 9, 2022

(86) PCT No.: PCT/EP2022/053149
§ 371 (c)(1),
(2) Date: Jul. 5, 2023

(87) PCT Pub. No.: WO2022/171686
PCT Pub. Date: Aug. 18, 2022

(65) Prior Publication Data
US 2024/0054248 A1 Feb. 15, 2024

(30) Foreign Application Priority Data

Feb. 9, 2021 (NL) ..................................... 2027526
Dec. 23, 2021 (NL) ..................................... 2030253

(51) Int. Cl.
| | |
|---|---|
| *G06F 21/62* | (2013.01) |
| *G06T 7/73* | (2017.01) |
| *G06T 7/90* | (2017.01) |
| *G06V 10/25* | (2022.01) |
| *G06V 10/44* | (2022.01) |

(Continued)

(52) U.S. Cl.
CPC ............ *G06F 21/6254* (2013.01); *G06T 7/73* (2017.01); *G06T 7/90* (2017.01); *G06V 10/25* (2022.01); *G06V 10/44* (2022.01); *G06V 10/56* (2022.01); *G06V 20/52* (2022.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | |
|---|---|---|
| 6,542,185 B1 | 4/2003 | Bogardus |
| 8,345,921 B1 | 1/2013 | Frome |

(Continued)

OTHER PUBLICATIONS

Hukkelås et al., "DeepPrivacy: A Generative Adversarial Network for Face Anonymization" Oct. 21, 2019. Advanced in Cryptology—Crypto 2013 [Lecture Notes in Computer Science], Springer Berlin Heidelberg, pp. 565-578.

(Continued)

*Primary Examiner* — Joshua Joo
(74) *Attorney, Agent, or Firm* — KDW Firm PLLC

(57) ABSTRACT

A method for anonymizing video data in a hospital environment includes obtaining video data using a video camera, where the video data includes a sequence of a plurality of digital images each comprising a plurality of pixels, determining at least one region of interest, ROI, within a digital image, detecting if a ROI comprises identification features which allow the identification of a person in the hospital environment, anonymizing the detected identification features in the digital images, and outputting the anonymized video data.

19 Claims, 6 Drawing Sheets

Figure 1:
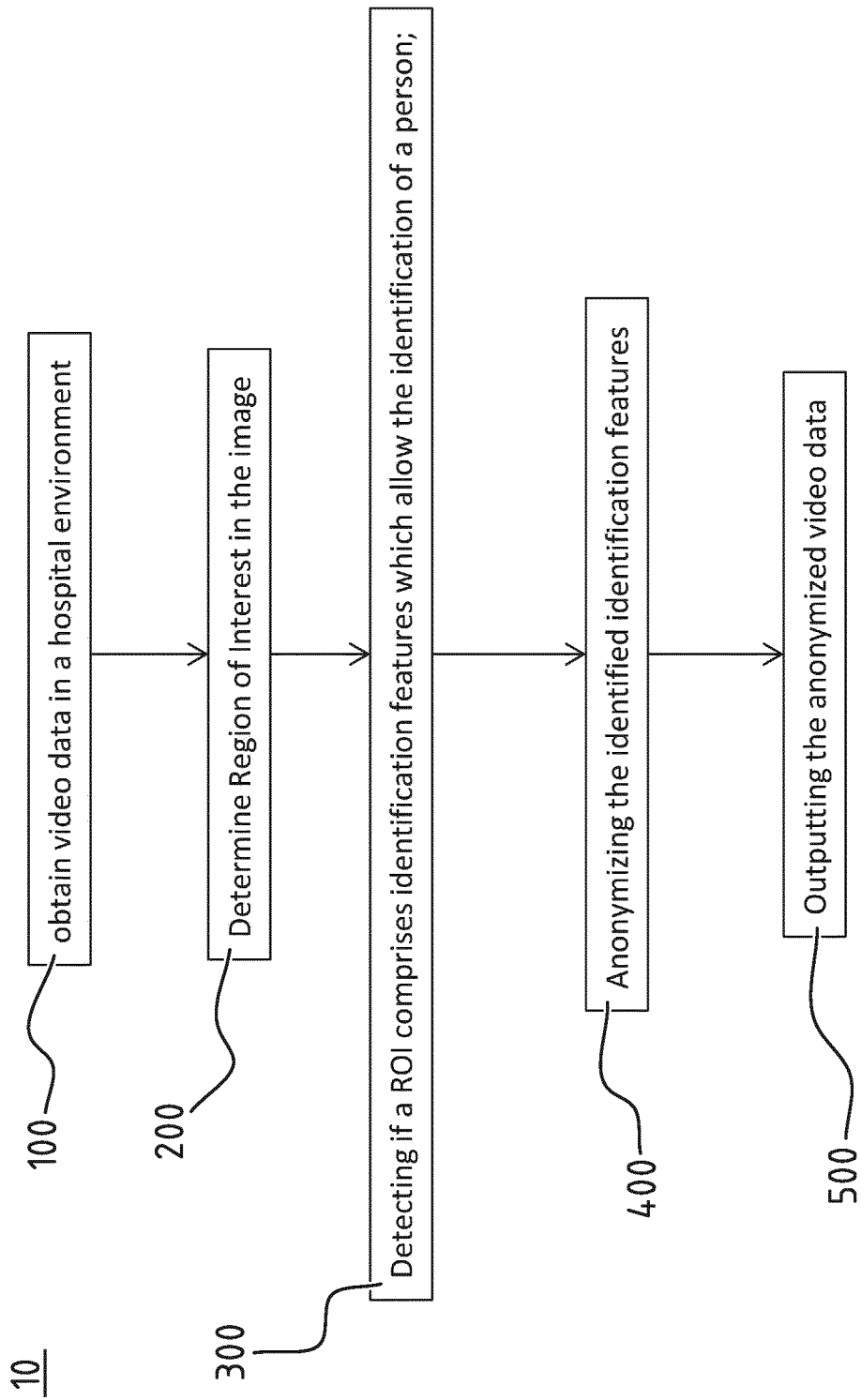

(51) Int. Cl.
G06V 10/56 (2022.01)
G06V 20/52 (2022.01)

(56) References Cited

U.S. PATENT DOCUMENTS

| | | | | |
|---|---|---|---|---|
| 9,141,852 | B1* | 9/2015 | Cosgun | G06V 40/10 |
| 2004/0017930 | A1* | 1/2004 | Kim | G06V 40/161 |
| | | | | 382/118 |
| 2005/0143183 | A1* | 6/2005 | Shirai | A63B 24/0006 |
| | | | | 473/151 |
| 2011/0246895 | A1* | 10/2011 | Roulliere | G06V 20/30 |
| | | | | 715/733 |
| 2018/0276499 | A1 | 9/2018 | Bak | |
| 2020/0143144 | A1* | 5/2020 | Hanina | G16H 10/60 |
| 2020/0320665 | A1* | 10/2020 | Eswara | G06T 7/90 |
| 2021/0240851 | A1* | 8/2021 | Badalone | H04W 4/029 |
| 2022/0030180 | A1* | 1/2022 | Aramaki | G06T 7/194 |
| 2022/0147736 | A1* | 5/2022 | Chan | G16H 30/40 |
| 2023/0102479 | A1* | 3/2023 | Joecker | G06V 20/52 |
| | | | | 382/100 |

OTHER PUBLICATIONS

Martinez-Ponte, Isabel et al. "Robust Human Face Hiding Ensuring Privacy." 6th International Workshop on Image Analysis for Multimedia Interactive Services. Apr. 13, 2005, pp. 1-4. (2004).

Liu Suolan et al., "Face Detection and Encryption for Privacy Preserving in Surveillance Video" Nov. 3, 2018, Advanced in Databases and Information Systems [Lecture Notes in Computer Science, Springer International Publishing, Cham. pp. 162-172.

ZhongZheng Ren et al., "Learning to Anonymize Faces for Privacy Preserving Action Detection" Arvix.org. Cornell University Library, Mar. 30, 2013.

International Search Report and Written Opinion for the International Application No. PCT/EP2022/053149, mailed Aug. 8, 2022, 18 pages.

* cited by examiner

METHOD FOR ANONYMIZING VIDEO DATA

This application is a national stage filing under 35 U.S.C. 371 of pending International Application No. PCT/EP2022/053149, filed Feb. 9, 202, which claims priority to Netherlands Patent Application No. 2027526, filed Feb. 9, 2021, and also claims priority to Netherlands Patent Application No. 2030253, filed Dec. 23, 2021, the entirety of which applications are incorporated by reference herein.

The present invention relates to a method for anonymizing video data, in particular in a hospital environment. The invention further relates to a computer program product comprising a computer-executable program of instructions for performing the method and to a system for anonymizing video data in a hospital environment.

Hospital environments or, more generically medical environments, are subject to optimization and standardization processes, including for instance resource planning and optimization of standard operating procedures. The resource planning comprises a plurality of aspects such as patient flows, material flows, medical and non-medical personal schedules. Safeguarding said resource planning is critical for the workings of hospital environments. An interaction between the plurality of aspects is highly complex and a change in one flow effects the performance of another flow. For example, a lack of a certain medical supply is detrimental for the treatment of patient. Also, time of a doctor is wasted because of the unavailability of the medical supply. Another example is the time taken to move from one room to another or even in a single room from one point in the room to another point to pick up, for example, a tool is difficult to log or gain an insight therein. Optimizing such resource planning is thus complex because of the highly convoluted and intricate interaction between the plurality of aspects. Because of the complexity and intricacy of the interactions of the plurality of aspects optimizing resource planning is difficult. On a smaller scale, such as in an operating room, the same problems exist.

Machine learning solutions or optimization algorithms may be modelled to recognize patterns, interpret data and cluster or label raw input data. However, such solutions require a specific set of training data which is not readily available. For privacy and/or security reasons, the inner workings of hospital environments are not publicly disclosed. In particular patient details are securely protected and such patient details are not usually required for process optimization.

In order to obtain the training data, it is thus suggested to use video data. Video capturing devices are arranged to gather insights in the on-going processes in for example an operating room. However, the obtained video data must be anonymized before it is allowed to be used for optimizing hospital resource planning in the hospital environment.

The object of embodiments of the present invention is to provide an improved method for anonymizing video data, for instance in a more secure and/or efficient way.

According to a first aspect of the present invention there is provided a method for anonymizing video data in a hospital environment according to claim 1. More specifically, the method comprises obtaining video data using a video camera, wherein the video data comprises a sequence of a plurality of digital images each comprising a plurality of pixels. The method comprises determining at least one region of interest, ROI, within a digital image comprised in the sequence of plurality of digital images. Further, the method comprises detecting if a ROI comprises identification features which allow the identification of a person in the hospital environment. The detected identification features are anonymized in the digital images comprised in the sequence of plurality of digital images and the anonymized video data is output.

Obtaining video data using a video camera allows obtaining real life trajectories of medical and non-medical personal, track movement thereof, observe interactions, and more generally, monitor the flow and use of resources in a legitimate hospital environment. The video data may allow tracking the actions of medical personnel for comparison with a Standard Operating Procedure (SOP) to define the efficiency of a procedure. The legitimacy of the data ensures the reliability of the data post-processing and thus the obtained results and/or analysis. In other words, otherwise unreasonable, unconventional or unreal situations which would negatively influence the optimization of the resource planning are excluded from the start. In the current context, a specific example of obtaining video data in an operating room will be used to elaborate the features of the plurality of embodiments. Video data is a sequence of digital images obtained by the video camera, wherein each digital image represents a still image of a specific situation in time in the room wherein the video camera is arranged.

Determining a Region of Interest, abbreviated as ROI, is advantageous for a plurality of reasons. The ROI is a proposed region in the digital image which is used in further processing, as will be elaborated here below, after the ROI has been determined. This allows to limit the further processing to the ROI rather than perform further processing on the entirety of the digital image. It will be clear that reducing further processing to a more specific region of the digital image, i.e. the ROI requires less recourses to be used, thus improving the efficiency and speed of the method. ROI's may for example be a position of a tool table or a surgeon or assistant in the operating room. Further examples of ROI's comprise tool positions, medical equipment locations, etc.

Detecting if a ROI comprises identification features is, as explained here above, further processing of the digital image. Identification features are, in the current context, defined as a physical identifying feature, such as a face, of a person such as a surgeon or patient. In other words, identification features represent physical characteristics which allow the identification of a human in the hospital environment, such as the face, tattoos, birth marks or other distinct features of a human. This is distinguishable from other physical components present in the hospital environment, such as tools, a lighting means, an operating or tool table.

If a ROI comprises identification features which allow the identification of a person in the hospital environment, said identification features are anonymized. Anonymizing is in this context defined as rendering a person non-identifiable from the video data, in particular with the intent to protect their privacy. In this way, ROI's with regards to, for example, tools such as scalpels are visible and are consequently available to be used for interpreting and optimizing the resource planning of the hospital environment while the privacy of the patient and/or medical staff are protected.

The anonymized video data being output, allows to interpret the video data further without disclosing privacy information of patients or medical personnel.

Preferably, the determining at least one ROI comprises determining a ROI using skin colour detection for detecting a skin region. Using skin colour detection determines a ROI comprising at least areas of a human body where skin is exposed. In this way the ROIs comprising identification features are substantially narrowed down, increasing the speed of which the method may detect identification features. This advantage is based on the insight that in a hospital environment a typically exposed area of skin is at least a portion of the face. Personnel and/or patients are typically protected by facial masks or protective clothing. Other exposed areas are for example hands or arms of a person up to the full patient body during surgery, for instance during the parts of the surgery where the patient will actually be fully exposed. This may for instance be the case between taking of the gown and the sterile draping and between removal of the sterile draping and covering the patient up again.

More preferably, the skin colour detection comprises comparing pixel colour information of the plurality of pixels in a digital image with a predetermined colour range threshold. The pixel information may for instance comprise RGB, HSV or CMYK data, or any other pixel colour representation data. If the pixel colour information of a pixel of the plurality of pixels falls within the colour range threshold, a skin colour mask for said pixel is generated. Comparing the pixel colour information of the plurality of pixels, in particular the pixels comprised in the ROI, to a predetermined colour range threshold allows to set said predetermined colour range prior to initiating the method. Generating the skin colour mask for the pixel has the advantage that such a mask may be used in post-processing or in further steps. Also, because the pixel value is not yet adjusted in this step, the pixel colour information is maintained in the digital image which allows the digital image to be further processed without adjustments, as will be elaborated here below. In this way, further processing steps or steps which occur in parallel are not inhibited by adjusted pixel values and are thus more optimally performed.

More preferably the comparing of the pixel colour information further comprises comparing a hue attribute of the pixel colour information of the plurality of pixels to a predetermined hue range threshold. Preferably, the predetermined hue range threshold is 0° to 30°, more preferably 12° to 25°. The advantage hereof is based on the insight that because colour information which is defined in RGB colour representation data typically encompasses a full range of colour tone variations through mixing reds, greens and blues which is also used to determine a darkness and a lightness of the mixed colour. A threshold range of RGB data values which represent human skin in video data has to be defined broadly. The RGB data also varies significantly in light and dark environments. This broad RGB data range results in false positives. Instead, a hue range threshold is preferred. The advantage hereof is further based on the insight that all human skin has a similar hue value as it is defined by the colour of the blood inside the skin. Additionally, the amount of melanin merely defines the brightness of the skin colour. The use of a Hue Saturation Brightness, HSB, colour representation data scheme (also known as HSV) is thus preferred because HSB allows to compare just the hue value of the human skin to a predetermined hue range threshold. In this way the pixel colour information, particularly the hue value thereof, is compared with a substantially smaller threshold range irrespective of brightness or saturation compared to the RGB colour representation data. As a result, the success chance of detecting skin colour is increased compared to RGB based skin identification, with a significant decrease in false positives and a moderate decrease in false negatives. In other words, the method performs the skin detection in a more efficient and robust way. More preferably, when the hue range threshold is larger than 30°, the method comprises ignoring regions having a hue range threshold larger than 30°. This reduces the computational complexity.

Preferably, the determining at least one ROI comprises estimating a pose of at least one person. The combination of position and orientation is referred to as the pose of a person, but can also only be used to describe the orientation. Estimating the pose of a person is advantageous in particular in the context of the hospital environment because it allows to distinguish between patients lying down, surgeons operating or even assistants assisting said surgeons. Pose estimation also allows to optimize detection of other ROI based on the estimated pose as will be elaborated here below.

More preferably, the pose estimation comprises determining one or more keypoints for the person in the digital image, matching the one or more keypoints to a predetermined point cloud representing a human pose and estimating the pose of the person in the digital image based on the matching. Keypoints are defined as spatial locations or points in a digital image which, when connected, describe the pose of the person. For example, a close analogy of connected keypoints is a human pose skeleton. Keypoints are paired by a connection to form a pair which represents a limb or body part of a person. A valid connection between keypoints is established by comparing the keypoints to a predetermined point cloud representing a human pose. Knowing the pose of a person allows for activity recognition of the person or people in the room. This allows to monitor and distinguish between a patient lying on an operating table and a surgeon operating on said table. This also allows to track the motion for further analysis as elaborated here below.

Preferably, the method comprises outputting the pose data. Pose data is inherently anonymous and usable in a plurality of scenarios. For example, pose data is usable for improving resource planning or monitoring an ergonomic situation of the surgeon such as monitoring if tools are within reach at the appropriate time for the intervention. Pose data is also useable to verify if the surgeon is operating on, for example, the correct leg such that medical blunders can be avoided.

It is preferred to generate the pose data based on the not-yet anonymized video data, i.e. digital images, as extracting this data from anonymized video data proved to be difficult. As the pose data was recognized to be useful, for instance as training data in machine learning solutions, the pose data is generated and may be output together with the anonymized video data.

In the alternative, only pose data is output. The step of anonymizing the detected identification features may then also be skipped.

Generally, the method may comprise a step of, prior to the step of anonymizing the digital image or sequence of digital images, determining statistical data, such as the pose data as mentioned above. The method then preferably comprises the step of outputting the statistical data. As mentioned above, it may also be the case that only the statistical data is output. It is recognised that some data which is relevant for further analysis, is difficult to obtain, from the anonymized video data. As such, this statistical data is obtained prior to anonymization.

The method may for instance further comprise providing labelling information as statistical data. Objects, including persons, in the digital images may be provided with a label, preferably anonymized, for tracking objects in the sequence of digital images. The labelling information may comprise a label, for instance randomly generated label, in combination with coordinate data defining the location of the object in the digital image. Providing a label may further include determining, from the digital image and possibly in combination with the pose data, a role of a person in the digital image and providing a role label. For instance, based on the colour of the scrub, it may be determined whether a person is a scrub nurse or a surgeon.

This statistical data may comprise numerical data, as opposed to for instance video or image data, and may be output in parallel to the video data. Additionally or alternatively, the statistical data is combined with the video data, preferably the anonymized video data. As an example, the pose data, for instance in the form of the interconnected key points, or labelling information in graphical form, may be overlaid on the anonymized video data for combined output.

Preferably, the method comprises identifying at least one keypoint corresponding to a head region of the person in the hospital environment based on the estimated pose; and generating a head region mask corresponding to the identified head region. Pose data allows to identify a head region in a relatively simple and efficient way because the location and orientation of a head of a person is always the same and easily derivable from a pose of the person. This is advantageous in for example operating rooms where a surgeon is typically wearing a mouth mask, a face shield and dressed in hygienic attire. Such an attire and mouth mask, or shield mask substantially complicates facial recognition or even skin detection. Similarly to the medical personnel, a patient is typically covered by a plurality of medical attire or medical equipment such as a breathing apparatus. Using pose data further improves the security of privacy of the person because it allows to detect the head region of a person irrespective of a skin colour is detected or a face is recognized More preferably the method comprises tracking variations of the pose estimation between digital images comprised in the sequence of digital images in the video data. As elaborated here above, tracking variations of the pose estimation between digital images allows the tracking of motion in an anonymous way.

The method may thus include the step of determining at least one region of interest, ROI, within a digital image comprised in the sequence of plurality of digital images on the basis of a determined ROI in a previous digital image in the sequence of digital images. Thus, even if a region would not be recognized as a region of interest in a single digital image, the region may still be determined to be region of interest by the fact that in a previous digital image, said region was determined to be of interest.

Preferably the method comprises using the detected skin region and pose estimation to estimate a facial region of the person. A mask is generated exclusively corresponding to the facial region of the person based on the estimated pose and the detected skin region. This allows to further improve the security regarding the privacy of the personnel and/or patient in the room because the detected skin region and pose estimation beneficially influence each other. More in particular, the detected skin region increases the probability that a keypoint of the pose estimation is detected as a head region. Vice versa, where a plurality of skin regions is detected, the pose detection excludes unreasonable possibilities such as hands as a facial region.

Preferably, the determining of at least one ROI comprises determining a ROI using facial recognition for detecting a face region. As has been noted here above, a face of medical personnel or a patient are typically obstructed by, for example, a facial mask. Facial recognition can nonetheless be performed based on the relative position, size, and/or shape of the eyes of a person. In this way the security regarding the privacy of the person may further be ensured.

More preferably, the method further comprises generating a face region mask based on the detected face region. Generating the face region mask has the advantage that, as elaborated her above, such a mask may be used in post-processing or in further steps. Also, because the pixel values of the digital image are not yet adjusted in this step, the information is maintained in the digital image which allows the digital image to be further processed without adjustments. In this way, further processing steps or steps which occur in parallel are not inhibited by adjusted pixel values and are thus more optimally performed.

More preferably, the method comprises using the detected skin region, face region and pose estimation to detect a facial region of the person. The method preferably further includes generating a mask exclusively corresponding to the facial region of the person based on the detected skin region, face region and pose estimation. An advantage hereof is based on the insight that the above methods for detecting a facial region are not flawless. In this way, even in the event that one of the above described methods for identifying identification features or ROIs does not detect any identification features or a ROI, a combination thereof still leads to anonymized video data. Instead of increasing the complexity of the respective identification methods, and thereby increasing the required computing power, a combination of the respective identification methods substantially guarantees the anonymity of personnel and patient without the need to substantially increase the computational power.

Preferably, the determining at least one ROI, in particular for recognizing a face, comprises a combination of at least two detection processes of:
  skin detection including detecting skin colour for detecting a skin region, preferably as described above;
  pose detection including estimating a pose of at least one person in the hospital environment, preferably as described above, and;
  facial detection including estimating a facial region of the person, preferably as described above.

Preferably, in performing each of the detection processes, a respective sensitivity parameter is used for the respective detection process. It is then preferred if the sensitivity parameter of a first detection process is based on the detection result of a second detection process. If for a digital image a face, or other ROI, is recognized using a first detection process, for instance based on pose detection, but not using a second detection process, for instance the facial detection process, the sensitivity of the second process may be increased, for instance incrementally. To prevent false positives, the second sensitivity may increased up to a predetermined threshold.

The method may thus include the step of:
  detecting a ROI using a first detection process having a first sensitivity,
  establishing that said region is not detected in a second detection process having a second sensitivity, and
  increasing the sensitivity of the second detection process until the ROI as detected by the first detection process is detected.

The step of increasing may be an iterative process wherein a digital image, or a plurality thereof, is processed more than once, while the sensitivity may be increased incrementally.

More preferably, the method comprises superimposing the skin colour mask, the face region mask and the head region mask on the digital image and anonymizing a region comprising at least a portion of the skin colour mask, the face region mask and the head region mask. In this way, anonymity of personnel and patient are further ensured.

Preferably, each digital image of the sequence of plurality of digital images is anonymized. An advantage hereof is based inter alia on the insight that for a video to be visually anonymized, only a select amount of images per second need to be anonymized since the human eye can only typically see between thirty and 60 frames per second. To avoid extraction of non-anonymized digital images from the sequence of plurality of digital images, each digital image contained in the sequence is anonymized, thus ensuring the privacy of the patient and/or medical personnel.

At least, each digital image of the output video data is anonymized. Preferably, the frame rate, i.e. the number of digital images per time period, of the obtained (input) video data corresponds to the frame rate of the output video data. Each of the digital images, i.e. frames, is then anonymized. In the alternative, only a part of the input digital images is anonymized, wherein said part of the digital images is output as anonymized video data.

Preferably, the input video data is anonymized real time. A digital image as recorded may then be processed immediately and output. The of anonymizing may thus include anonymizing the detected identification features in said digital image. Storing the obtained video data, besides perhaps temporally and locally for processing, is then not required. Leakage of the obtained video data is then prevented.

In the alternative, the video data may be anonymized in parts, i.e. a plurality of digital images in the sequence of digital images may be processed in one operation, or even as a whole, for instance after recording. It may for instance be possible that the step of determining the ROI and/or the step of detecting if a ROI comprises identification features is also performed for a part of the video data or the video data as a whole.

The method may thus include the step of determining at least one region of interest, ROI, within a digital image comprised in the sequence of plurality of digital images on the basis of a determined ROI in a previous and/or next digital image in the sequence of digital images. Thus, even if a region would not be recognized as a region of interest in a single digital image, the region may still be determined to be region of interest by the fact that in a previous or next digital image, said region was determined to be of interest.

For instance, in one digital image a face or other feature may be detected, while in the next digital image no face is detected. As a person cannot disappear, the corresponding region in the digital image may still be considered as a ROI comprising identification features and could thus be anonymized.

Preferably, exclusively anonymized data is output. This anonymized data preferably only consists of the anonymized video data, optionally in combination with the pose data as mentioned above. Put differently, anonymization is performed on-site without video data containing identification features leaving the hospital environment. Preferably, the method as described in performed in a single processing device. Transfer of in particular the obtained video data is then not necessary.

Preferably, the at least one ROI is traced between two or more digital images of the sequence of plurality of digital images. Image tracing allows to reduce the computational complexity of the method and reduces the amount of determination Preferably, the method further comprises calibrating the video camera having video camera sensor values, which calibrating comprises providing a calibration image having a predetermined calibrated colour information included, for instance printed, on the calibration image, obtaining at least one digital image of the calibration image using the video camera, comparing video camera sensor values to the predetermined calibrated colour information of the calibration image; adjusting the video camera sensor values based on the comparison such that a difference between the video camera sensor values and the predetermined calibrated colour information of the calibration image is reduced, preferably minimized. Calibrating the video camera further improves the colour recognition aspects of the method, particularly the detecting of skin regions. Providing the calibration image may be performed by showing a pre-printed template having the predetermined calibration colour information printed thereon. Further information may be encoded on the calibration image, for example a Quick Response code may be printed on the calibration image, which QR code prompts the calibration of the video camera in an automatic way. Moreover, accurate colour recognition improves further aspects of the method such as pose detection, object detection etc. The predetermined calibrated colour information may comprise a colour calibration target and a corresponding calibrated colour output value, wherein the colour calibration target is a desired or intended colour reference and the corresponding calibrated output value is an expected video camera sensor value. A calibration correction profile may be constructed based on the difference between video camera sensor values and the known colour reference. The predetermined calibrated colour information may be printed on a colour reference card which is a physical, typically flat, object comprising said colour information printed thereon. The corresponding calibrated colour output value may be provided using for example a QR-code etc. Alternatively or additionally, calibrating the video camera may be performed by detecting skin region, generating a skin colour mask, measuring the colour range in of the skin colour mask, and adjusting the adjusting the camera sensor values based on the measured colour range.

Preferably the method comprises storing the obtained at least one digital image of the calibration image, and monitoring changes of the video camera sensor values with respect to the stored at least one digital image of the calibration image. Changes may occur, for example because of the influence of the light throughout the day. In this way, calibration may be performed regularly throughout the day thus substantially ensuring optimal conditions for the detecting of skin regions.

In other words, the video camera sensor values may be updated throughout the day. Also, regions differing from the calibration image may be used to update video camera sensor values. For example, when the image of the calibration image is obtained, it is preferred that the calibration image is physically situated near a centre point between the video camera and the surrounding walls. In this way, light influx from all sides reflect from the calibration image and the calibration of the video sensor is performed taking into account a substantially maximum amount of light influence factors into account. A further advantage hereof is based on the insight that the video camera obtains an image comprising the calibration image but also comprising the surrounding environment. Said surrounding environment, barring any movable objects, typiccaly changes very little. At the time of day when the calibration is performed, the reflection of all surfaces is correlatable to the reflection of the calibration image. For example, a wall region reflecting light is correlatable to the light reflecting from the calibration image. This first calibration image, otherwise described as an initial calibration image is used to calibrate the video sensor throughout the day. In particular the reflections from surfaces comprised in the initial calibration image are compared to the light reflection from surfaces throughout the day such that the difference between the initial calibration image and the current obtained image may be used to calibrate the video sensor values based on reflections from the surrounding environment.

Preferably, the method further comprises obtaining location information of the video camera, mapping the monitored changes of the video camera sensor values to the obtained location information; and storing the mapped changes and location information in a calibration database as mapping information. More preferably, the method further comprises predicting changes of the video camera sensor values positioned on a location based on the stored mapping information; and adjusting the video camera sensor values based on the predicted changes. In this way a database comprising mapping information is created and usable for calibration of the video camera. Moreover, the information is useable to predict changes based on known information and correspondingly adjust the video camera values thus improving the robustness and increasing the efficiency of method.

Preferably the step of calibrating the video camera is intermittingly performed during the method.

According to another aspect of the present invention, there is provided computer program product comprising a computer-executable program of instructions for performing, when executed on a computer, the steps of the method as described here above.

It will be understood by the skilled person that the features and advantages disclosed hereinabove with respect to various embodiments of the method may also apply, mutatis mutandis, to various embodiments of the computer program product.

According to another aspect of the present invention, there is provided a system for anonymizing video data in a hospital environment, the system comprising a video camera for obtaining video data, wherein the video data comprises a sequence of a plurality of digital images each comprising a plurality of pixels and a video processor configured to perform, the steps of the method as described here above.

It will be understood by the skilled person that the features and advantages disclosed hereinabove with respect to various embodiments of the method may also apply, mutatis mutandis, to various embodiments of the system.

According to yet another aspect of the present invention, there is provided a method for downloading to a digital storage medium a computer-executable program of instructions to perform, when executed on a computer, the steps of the method described above.

It will be understood by the skilled person that the features and advantages disclosed hereinabove with respect to embodiments of the method may also apply, mutatis mutandis, to embodiments of the method for downloading.

Figure 2:
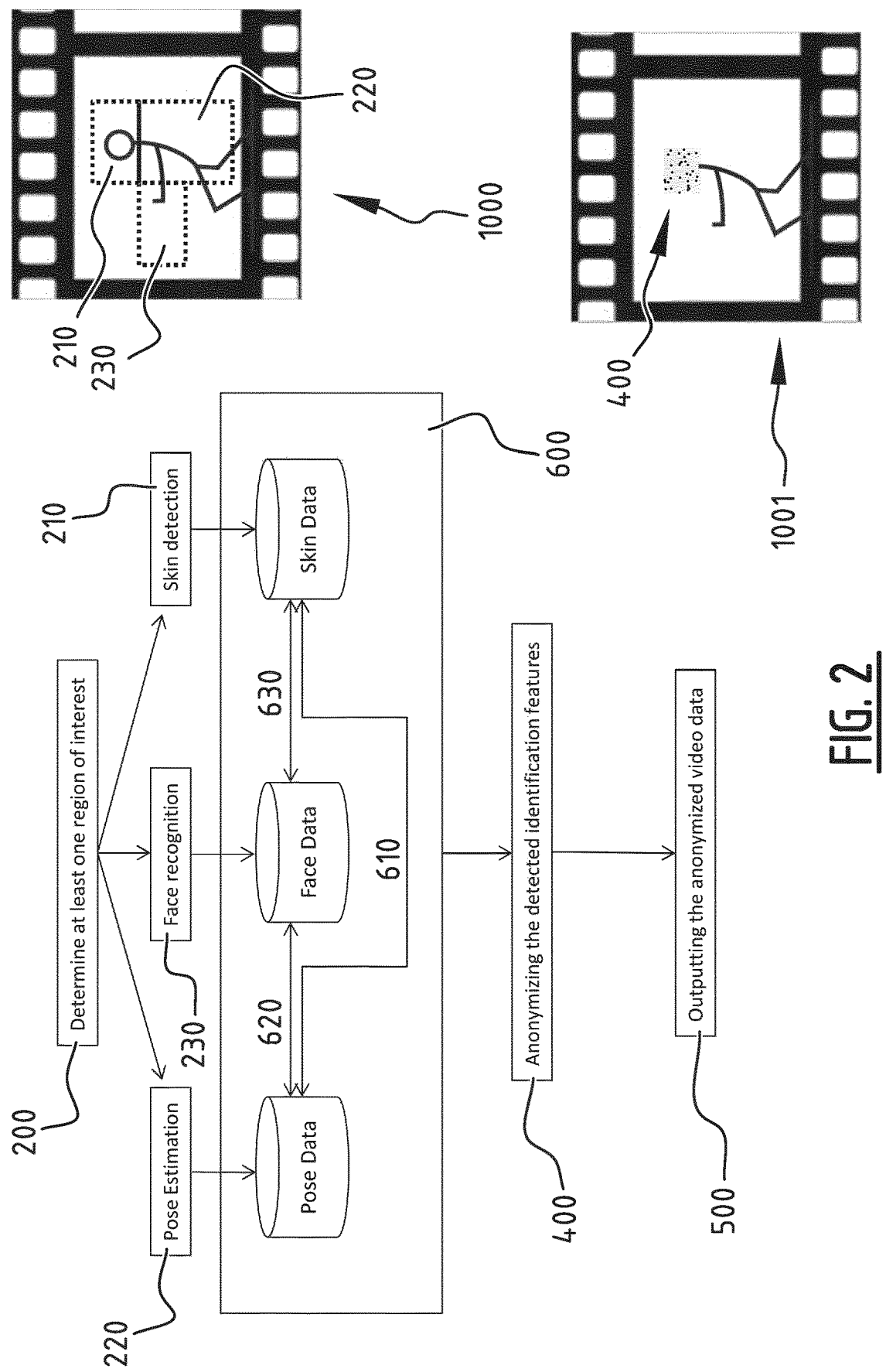
Figure 3:
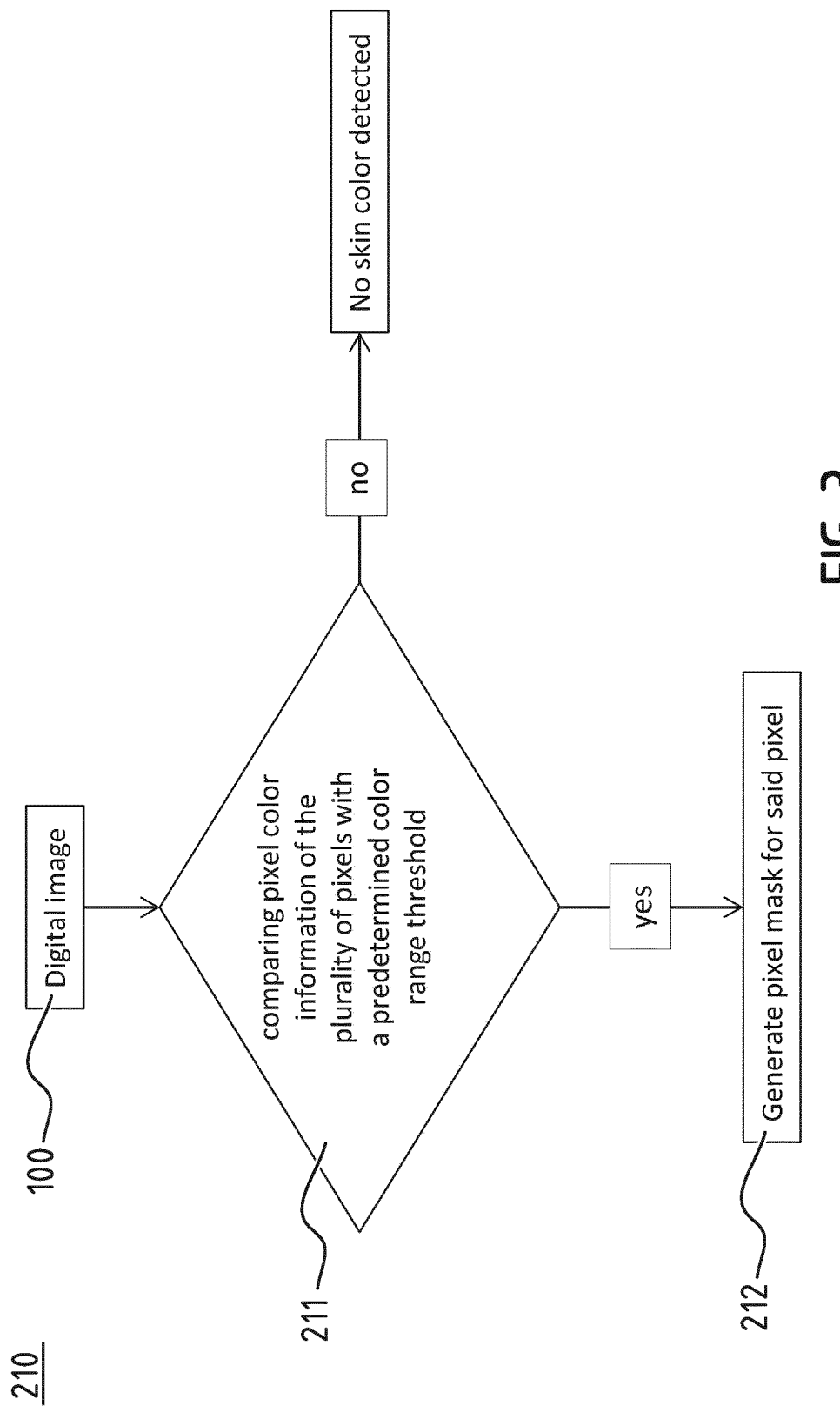
Figure 4:
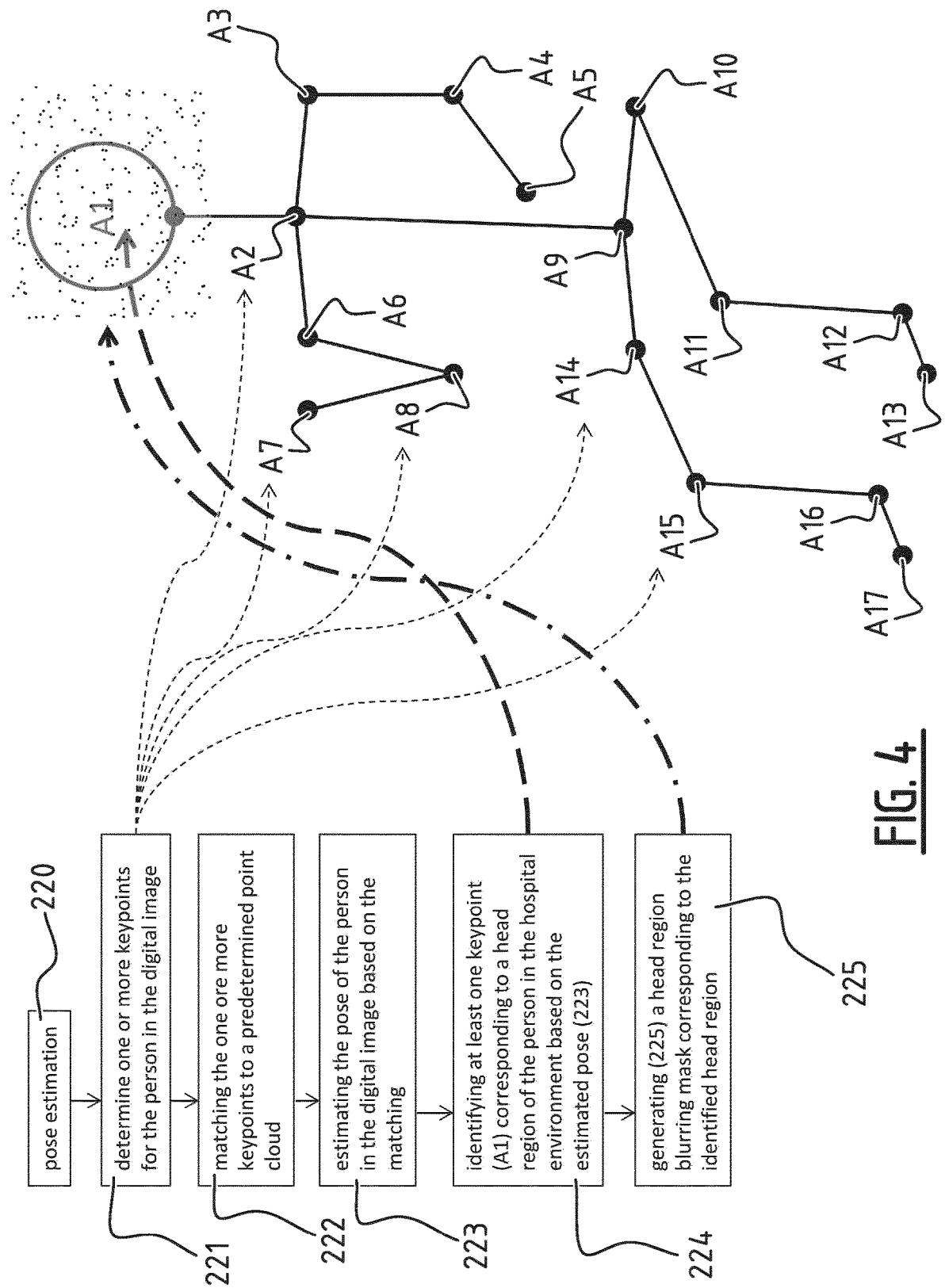
Figure 5:
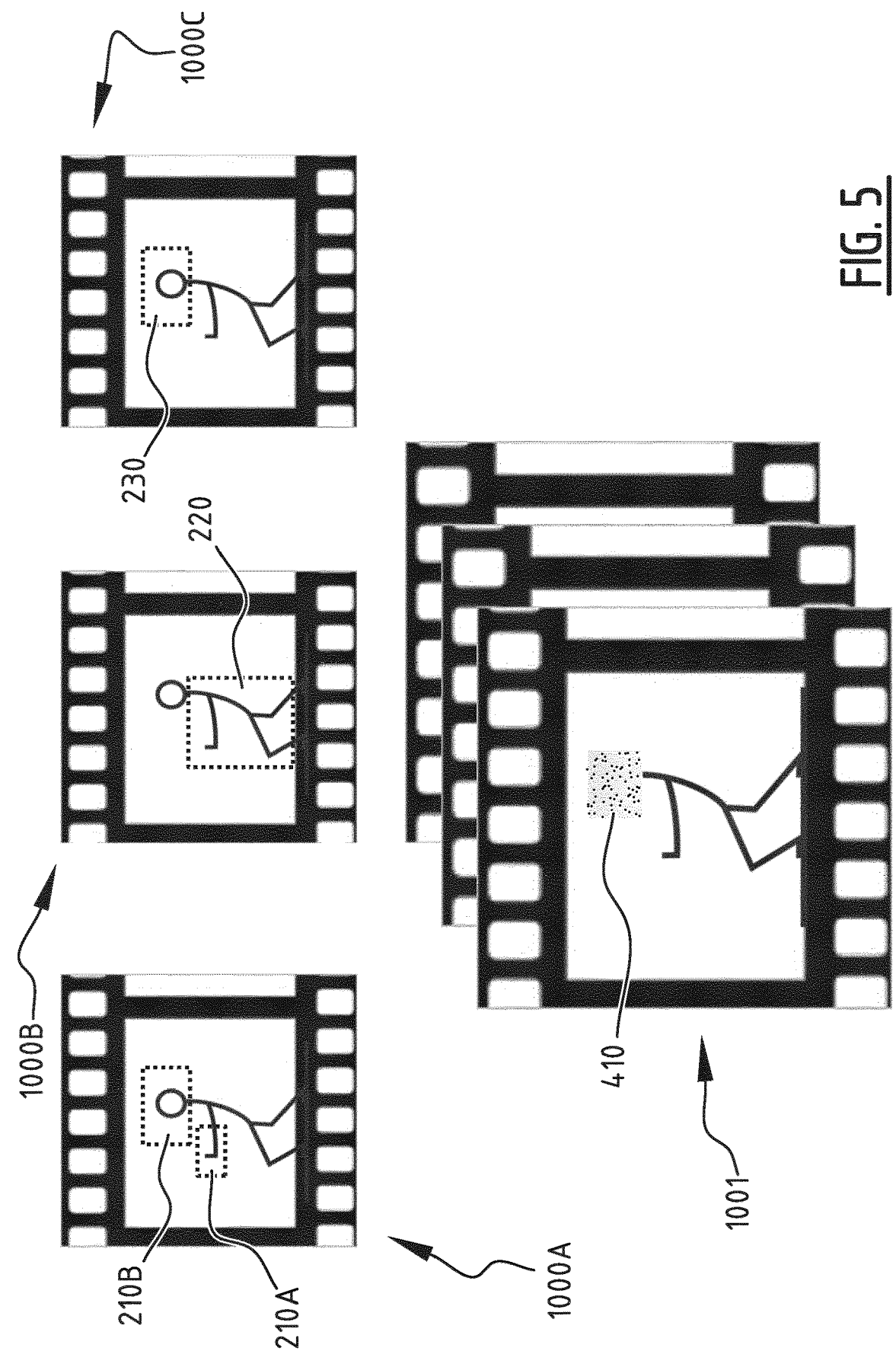
Figure 6:
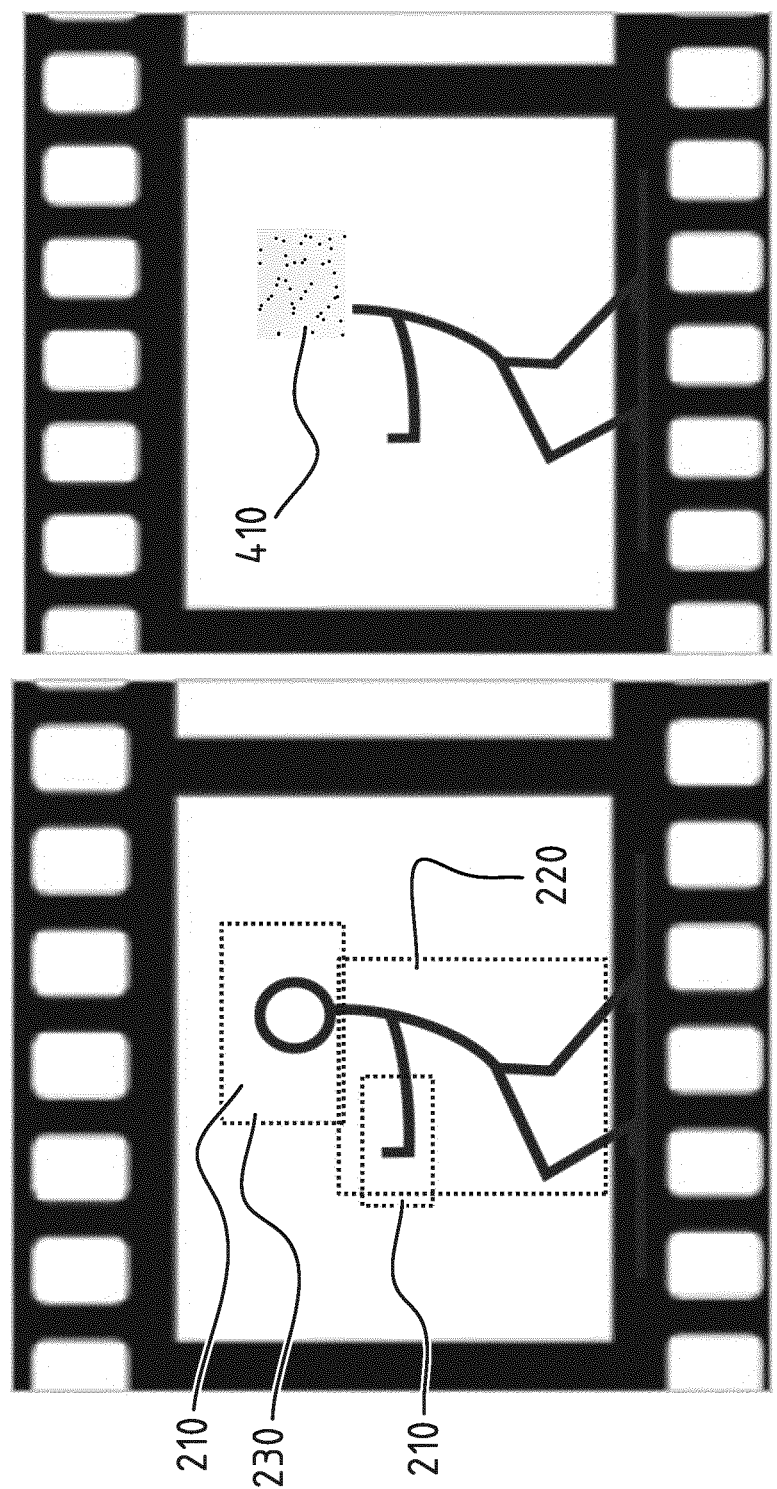

The accompanying drawings are used to illustrate presently preferred non-limiting exemplary embodiments of devices of the present invention. The above and other advantages of the features and objects of the present invention will become more apparent and the present invention will be better understood from the following detailed description when read in conjunction with the accompanying drawings, in which:

FIG. 1 schematically illustrates a flowchart of an embodiment of a method for anonymizing video data according to the present invention;

FIG. 2 schematically illustrates a flowchart of another embodiment of a method according to the present invention, e.g. a further development of the method embodiment shown in FIG. 1;

FIG. 3 schematically illustrates a flowchart of an embodiment of a skin colour detection according to the present invention;

FIG. 4 schematically illustrates a flowchart of an embodiment of pose detection in combination with a pose skeleton obtained using the pose detection according to an exemplary embodiment;

FIG. 5 schematically illustrates a method of using a detected skin region, face region and pose estimation to detect a facial region of the person according to a preferred embodiment;

FIG. 6 schematically illustrates a digital image obtained by a video camera and said digital image being anonymized according to an embodiment.

FIG. 1 schematically illustrates a flowchart of an embodiment of a method 10 for anonymizing video data. The method 10 for anonymizing comprises obtaining 100 video data using a video camera. The video data comprises a sequence of a plurality of digital images data 1000, 1001. Each of the digital images data 1000, 1001 comprised in the sequence comprise a plurality of pixels. A pixel represents the smallest single component of each digital image. It will be clear that pixels may be represented by electronic signals or digital values. An amount of pixels comprised in each digital image may correspond to a pixel count of the video camera.

The video data is obtained 100 using a video camera (not shown). The video camera may for example be a stand-alone device. The video camera may also be integrated in for example an electronic device such as smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, or a wearable device.

The method 10 further comprises determining 200 at least one Region of Interest within a digital image comprised in the sequence of plurality of digital images. A Region of interest is, in this context, abbreviated as ROI. The ROI is a proposed region in the digital image. The ROI is a sample region or subset of the digital image which has been determined for a particular purpose. Said particular purpose is in the current context, the detection of identification features 300 as will be elaborated here below. More in particular, the ROI is determined such that identification features which are comprised in the ROI may be detected in a more efficient way. Detecting identification features is computationally complex and requires a substantial amount of computational resources. To limit the amount of required resources the method determines 200 the ROI which broadly defines a region in which identification features may be found. According to an analogous example, determining the ROI is like pre-filtering the digital image to exclude regions which would implausibly comprise identification features. In this way, the method 10 limits the region in which the method 10 will perform the detection 300 of identification features to said ROI, rather than performing such a detection on the entirety of the digital image. Reducing further processing steps to a more specific region of the digital image, i.e. to the ROI requires less recourses to be used, thus improving the efficiency and speed of the method. Exemplary ROI's are a position of a tool table or a surgeon or assistant in the operating room. Further examples of ROI's comprise tool positions, medical equipment locations, faces of personnel and/or patients etc.

The method 10 further comprises detecting 300 if a ROI comprises identification features. Identification features are, in this context, defined as a physical identifying feature, such as a face, of a person such as a surgeon or patient. In other words, identification features represent physical characteristics which allow the identification of a human in the hospital environment. The presence or even derivability of such identification features is not allowed because of privacy regulations. Identification features are distinguishable from other physical components present in the hospital environment, such as scalpels, a lighting means, an operating or tool table. Other physical components present in the hospital environment do not allow to identify personnel and/or patients to such an extent that they compromise the privacy of said personnel or patients. On the contrary, other physical components, such as an operating table may aid in detecting identification features in an improved manner. For example, an operating table provides information relating to the patient lying thereon, which, in turn, may be used to more accurately determine, for example a facial region as will be elaborated here below.

Further, the method 10 comprises anonymizing 400 identification features if a ROI comprises identification features which allow the identification of a person in the hospital environment. In other words, the step of anonymizing 400 is conditionally and based on the presence of identification features. Anonymizing is in this context defined as rendering a person non-identifiable from the video data with the intent to protect their privacy. In this way, ROI's with regards to, for example, tools such as scalpels are not anonymized and are consequently available to be used for interpreting and optimizing the resource planning of the hospital environment while the privacy of the patient and/or medical staff are protected.

Finally, the method 10 comprises outputting 500 the anonymized video data. Outputting 500 the anonymized video data allows to interpret the video data further, for example for optimizing patient flows, without disclosing privacy information of patients or medical personnel. In this way a database comprising real life situational data can be developed in a secure way while simultaneously maintaining a substantial amount of data which is extractable from said video data and is intended to be used to optimize resource planning in a hospital environment.

FIG. 2 schematically illustrates a flowchart of a preferred embodiment of the method 10 shown in FIG. 1. FIG. 2 illustrates in particular that the method 10 may determine 200 a ROI in a plurality of ways. As will be elaborated here below, one or more ROI may be determined.

According to a first preferred embodiment the determining 200 at least one ROI comprises determining a ROI using skin colour detection 210 for detecting a skin region. In a hospital environment personnel and/or patients are typically protected by facial masks or protective clothing. An attire of personnel or patients introduces complex problems for determining an ROI for a plurality of reasons resulting in digital images where identification features are not detected. The complex problems which are introduced by the attire of patients and/or personnel will be respectively elaborated here below step-by-step. Additionally or alternatively, video data may be obtained comprising heat data. An infrared camera may be used to this end. It is further possible to use a LIDAR based camera.

A typically exposed area of skin is at least a portion of the face of a person. Other exposed areas can be for example hands or arms of a person. Using skin colour detection 210 substantially narrows down the ROIs comprising identification features, thus increasing the speed of which the method 10 may detect identification features. Also, skin colour detection 210 is relatively simple and requires a limited amount of computational resources whilst simultaneously providing good results. Determining 200 at least one ROI comprising determining a ROI using skin colour detection 210 will be elaborated with respect to FIG. 3. Further, skin colour detection 210 provides a reliable manner of identifying ROIs, in particular for digital images containing only parts of person, i.e. not a complete person to efficiently and/or reliably detect a pose as will be explained below.

According to a second preferred embodiment the determining at least one ROI comprises estimating 220 a pose of at least one person in the hospital environment, see for example the indicated dotted bracket in digital image 1000. A pose of a person is defined as at least an orientation of the body, or a portion thereof, of a person. The pose can also be used to describe the combination of position and orientation of a person. Estimating 220 the pose of a person is advantageous because it allows to distinguish between patients lying down, surgeons operating or even assistants assisting said surgeons. Pose estimation 220 also allows to optimize detection of other ROI based on the estimated pose as will be elaborated here below. Pose estimation 220 is also highly specific to the body characteristics of humans thus allowing to define a ROI comprising identification features in an optimal way.

Determining 200 at least one ROI comprising estimating 220 a pose of at least one person in the hospital environment will be elaborated with respect to FIG. 4. According to a third preferred embodiment, the determining 200 of at least one ROI comprises determining an ROI using facial recognition 230 for detecting a face region, see for example digital image 1000. As has been noted here above, a face of medical personnel or a patient are typically obstructed by, for example, a facial mask. Nonetheless, facial recognition can be performed based on the relative position, size, and/or shape of the eyes of a person. In this way the security regarding the privacy of the person may further be ensured.

Skin detection 210, pose estimation 220 and/or face recognition 230 may be performed simultaneously on a digital image 1000. Alternatively or in combination, skin detection 210, pose estimation 220 and/or face recognition 230 may be performed in a parallel way. For example, skin detection 210 may be performed on a first sample of a raw digital image, pose estimation 220 may be performed on a second sample of the same raw digital image and face recognition 230 may be performed on a third sample of the same raw digital image. In this way, the raw image data present in the digital image is not adjusted and each of the ROI determination steps may be performed irrespective of each other. For example, face recognition 230 does not influence pose detection 220 or skin detection 210.

According to a preferred embodiment skin detection 210, pose estimation 220 and/or face recognition 230 are interactive. With this is meant that a ROI obtained by, for example, skin detection 210 may be used to improve the chances that during pose estimation 220 identification features are identified and subsequently anonymized. According to an other example the pose estimation 220 can be used 620 to improve the face recognition 230, in particular because pose estimation 220 allows to deduce the head region of a person, the head region may subsequently be used for faced recognition in an improved way. Also, skin detection 210 may be interactively used 630 with face recognition 230.

As an example, skin detection 210 may detect a face of a first person, but no pose is detected pose estimation 220 may pick up a body for a second person at the other side of the room, but no face is detected by skin detection 210. Each of the algorithms know that there should be a body for the first person and a face for the second person. The sensitivity of the algorithm could for instance be lowered so that a face/body is detected. This allows data completeness. The same applies for the skin detection: if skin is detected with high probability, without any detection of the face or pose, the sensitivity, settings or parameters can be changed of the face and/or pose detection until the pose and/or face is recognized It will be clear that any one of the skin detection 210, pose estimation 220 and/or face recognition 230 may be used in combination with skin detection 210, pose estimation 220 and/or face recognition 230 to improve the probabilities of detecting identification features.

Further, the skin detection 210, pose estimation 220 and/or face recognition 230 are used to detect identification features in an improved manner. Said detected identification features can subsequently be anonymized 400 and the video data may be output. Anonymization may be performed by blurring the detected identification feature, changing their respective colour information, or superimposing a mask layer over identification features in the digital image. Preferably, exclusively anonymized video data is output. Put differently, anonymization is performed on-site without video data containing identification features leaving the hospital environment.

FIG. 3 illustrates schematically illustrates a flowchart of skin colour detection. According to the illustrated embodiment, the skin colour detection 210 comprises comparing 211 pixel colour information of the plurality of pixels in a digital image with a predetermined colour range threshold. For example, a square matrix (ranging from 1×1 to 27×27) of pixels of a digital image may comprise the colour green which may indicate an apron of a surgeon. Also, a pixel may comprise pixel colour information corresponding to a human skin tone. In order to detect if the pixel colour information corresponds with a human skin, the pixel colour information is compared 211 with a predetermined colour range threshold. Pixel colour information falling within the colour range threshold, for example a chromatic scale such as Von Luschan's chromatic scale, may indicate the presence of skin. Comparing 211 the pixel colour information of the plurality of pixels, in particular the pixels comprised in the ROI, to a predetermined colour range threshold allows to set said predetermined colour range prior to initiating the method. The skin colour detection is preceded by a colour modification of all frames.

If the pixel colour information of a pixel of the plurality of pixels falls within the colour range threshold, the method generates 212 a skin colour mask for said pixel. A skin colour mask is a layer intended to cover the corresponding pixel. Generating 212 the skin colour mask for the pixel has the advantage that such a mask may be used in post-processing or in further steps, in particular during anonymization of the digital image. Also, because the pixel value is not yet adjusted in this step, the pixel colour information is maintained in the digital image which allows the digital image to be further processed without adjustments or even to detect further ROIs. In this way, further processing steps or steps which occur in parallel are not inhibited by adjusted pixel values and are thus more optimally performed.

FIG. 4 on the left schematically illustrates a flowchart of an embodiment of pose detection, while FIG. 4 on the right illustrates a pose skeleton obtained using the illustrated pose detection method. As illustrated here above, the determining at least one ROI comprises estimating 220 a pose of at least one person in the hospital environment, see for example the indicated dotted bracket 220 in digital image 1000.

According to the illustrated preferred embodiment the pose estimation 220 comprises determining 221 one or more keypoints A1, . . . , An for the person in the digital image. The keypoints A1, . . . , An, in particular seventeen keypoints, are illustrated as a human pose skeleton in FIG. 4. Keypoints are defined as spatial locations or points in a digital image which, when connected, describe the pose of the person. For example, a close analogy of connected keypoints is a stick figure overlay illustrated in FIG. 4. Keypoint A1 corresponds to a head region of a human, while keypoint A3 and A6 correspond to a left and right shoulder, respectively. According to the example keypoints A4 and A8 correspond to the elbows and A5, A7 to the hands of a person.

The one or more keypoints A1, . . . , An are matched 222 with a predetermined point cloud representing a human pose. A valid connection between keypoints is established by comparing the keypoints to a predetermined point cloud representing a human pose.

The pose of the one or more people in the digital image is estimated 223 based on the matching. Knowing the pose of a person allows for activity recognition of the person or people in the room. This allows to monitor and distinguish between a patient lying on an operating table and a surgeon operating on said table. This also allows to track the motion for further analysis as elaborated here below.

Preferably, the pose estimation comprises identifying 224 at least one keypoint A1 corresponding to a head region A1 of the person in the hospital environment based on the estimated pose 223. Pose data allows to identify 223 a head region A1 in a relatively simple way because the location and orientation of a head of a person is always the same and easily derivable from a pose of the person. As has been elaborated here above in for example operating rooms where a surgeon is typically wearing a mouth mask, a face shield and dressed in hygienic attire, using the pose data to identify 223 is advantageous. Such an attire and mouth mask, or shield mask substantially complicates facial recognition or even skin detection. Using pose data further improves the security of privacy of the person because it allows to detect the head region of a person irrespective of a skin colour is detected or a face is recognized.

Subsequently, a head region mask is generated 225 corresponding to the identified head region A. A head region mask is a layer intended to cover the corresponding head region. More generically, the head region mask is intended to cover a portion of pixels corresponding to the head region A1. Generating 225 the head region mask for the head region has the advantage that such a mask may be used in post-processing or in further steps, in particular during anonymization of the digital image. Also, because the pixel values of the head region are not yet adjusted in this step, the information is maintained in the raw digital image which allows the digital image to be further processed without adjustments or even to detect further ROIs. In this way, further processing steps or steps which occur in parallel are not inhibited by adjusted pixel values and are thus more optimally performed. According to a preferred embodiment, the pose data is output. More preferably the method comprises tracking variations of the pose estimation between digital images comprised in the sequence of digital images in the video data.

According to a preferred non-illustrated embodiment, variations of the pose estimation between digital images are tracked. This allows the tracking of motion in an anonymous way, also the interaction of personnel, with the patient and/or tools can be tracked and subsequently used in optimizing a resource planning of the hospital environment.

As is clearly visible in FIG. 4, the head region detected by the pose estimation comprises a known relationship to the other regions of the body of a person. Beneficially, the detected skin region and pose estimation may be used in conjunction with each other to estimate a facial region of the person. The pose estimation provides a rough estimation of the possible location of the person and a skin region can confirm said estimation to be true for improved detection of identification features. A mask is subsequently generated exclusively corresponding to the facial region of the person based on the estimated pose and the detected skin region. Vice versa, where a plurality of skin regions are detected, the pose detection excludes unreasonable possibilities such as hands A5, A7 as a facial region.

FIG. 5 illustrates a preferred embodiment where detected skin region 210, face region 230 and pose estimation 220 are used to generate a mask. As elaborated with respect to FIG. 2 the method may determine a ROI in a plurality of ways, e.g. using skin colour detection 210, estimating 220 a pose and using facial recognition 230. FIG. 5 illustrates an exemplary embodiment where each of the skin colour detection 210, estimating 220 a pose and using facial recognition 230 are performed independent of each other on a digital image 1000a, 1000b and 1000c respectively.

The determined ROIs, indicated using the dotted bracket, using each of the respective methods for determining the ROI may comprise identification features. In the exemplary digital image 100A, two ROIs 210A, 210B are determined using skin colour detection 210. In particular a hand region 210A and a face region 210B are determined as being a ROI. The method subsequently detects if said ROIs comprise identification features. It will be clear that a digital image of a hand region does not allow identification in this context. However, the facial region allows identification of a person and will subsequently be anonymized. In general, using the illustrated embodiment of FIG. 3 a pixel mask may be generated for each pixel corresponding to a skin colour, i.e. a skin colour mask will be generated for the hands and the facial region. This ensures that even if identification features are not detected, the determined ROI are anonymized.

In the exemplary digital image 1000B one estimated pose is determined. In the exemplary digital image 1000c a face region is determined using face recognition 230.

FIG. 5 illustrates that the determined ROIs for each of the methods for determining ROIs may differ. According to the illustrated example, only the facial region 210B determined using skin colour detection and the facial region 230 using face recognition comprise the same identification features and overlap correspondingly.

As has been illustrated here above, the methods for determining ROI may be interactive. In FIG. 5 an example thereof is used. More in particular, the detected skin region, face region and pose estimation are used to detect a facial region of the person and a mask 410 exclusively corresponding to the facial region of the person based on the detected skin region, face region and pose estimation is generated. Such a mask may be generated by selecting only overlapping masks, for example by superimposing the skin colour mask, the face region mask and the head region mask generated using skin colour detection 210, estimating 220 a pose and using facial recognition 230, respectively. An advantage hereof is based on the insight that the above methods for detecting a facial region 230 are not flawless. In this way, even in the event that one of the above described methods for identifying a identification features or ROIs does not detect any identification features or a ROI, a combination thereof still leads to anonymized video data. Thus anonymity of personnel and patent are substantially guaranteed. In this way, anonymity of personnel and patient are further ensured.

FIG. 6 illustrates a similar embodiment as described in relation with FIG. 5. FIG. 6 illustrates in particular a preferred embodiment where the methods for determining ROI are simultaneously performed on a single digital image. Subsequently the detected skin region 210, face region 230 and pose estimation 220 are used to detect a facial region of the person. A mask 410 is generated which exclusively corresponds to the facial region of the person based on the detected skin region, face region and pose estimation.

According to a non-illustrated preferred embodiment, each digital image of the sequence of plurality of digital images is anonymized. An advantage hereof is based inter alia on the insight that for a video to be visually anonymized, only a select amount of images per second need to be anonymized since the human eye can only typically see between thirty and 60 frames per second. To avoid extraction of non-anonymized digital images from the sequence of plurality of digital images, each digital image contained in the sequence is anonymized, thus ensuring the privacy of the patient and/or medical personnel.

Preferably, the at least one ROI is traced between two or more digital images of the sequence of plurality of digital images. For example, the pose estimation is traced between every three frames. Image tracing allows to reduce the computational complexity of the method and reduces the amount of determination.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The program storage devices may be resident program storage devices or may be removable program storage devices, such as smart cards. The embodiments are also intended to cover computers programmed to perform said steps of the above-described methods.

The description and drawings merely illustrate the principles of the present invention. It will thus be appreciated that those skilled in the art will be able to devise various arrangements that, although not explicitly described or shown herein, embody the principles of the present invention and are included within its scope. Furthermore, all examples recited herein are principally intended expressly to be only for pedagogical purposes to aid the reader in understanding the principles of the present invention and the concepts contributed by the inventor(s) to furthering the art, and are to be construed as being without limitation to such specifically recited examples and conditions. Moreover, all statements herein reciting principles, aspects, and embodiments of the present invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the present invention. Similarly, it will be appreciated that any flowcharts, flow diagrams, state transition diagrams, pseudo code, and the like represent various processes which may be substantially represented in computer readable medium and so executed by a computer.

It should be noted that the above-mentioned embodiments illustrate rather than limit the present invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present invention can be implemented by means of hardware comprising several distinct elements and by means of a suitably programmed computer. In claims enumerating several means, several of these means can be embodied by one and the same item of hardware. The usage of the words "first", "second", "third", etc. does not indicate any ordering or priority. These words are to be interpreted as names used for convenience.

In the present invention, expressions such as "comprise", "include", "have", "may comprise", "may include", or "may have" indicate existence of corresponding features but do not exclude existence of additional features.

Whilst the principles of the present invention have been set out above in connection with specific embodiments, it is to be understood that this description is merely made by way of example and not as a limitation of the scope of protection which is determined by the appended claims.

The invention claimed is:

1. A method for anonymizing video data in an operating room, a clinic or a hospital room, the method comprising:
    obtaining video data using a video camera located in the operating room, the clinic or the hospital room, wherein the video data comprises a sequence of a plurality of digital images of activities within the operating room, the clinic or the hospital room, wherein each of the plurality of digital images comprises a plurality of pixels;
    determining at least one region of interest, ROI, within a digital image comprised in the sequence of plurality of digital images, wherein the determining at least one ROI comprises, for each digital image of said plurality of digital images,
        determining an ROI representative for a skin region;
        determining an ROI representative for a face region; and
        determining an ROI representative for a head region;
    detecting if a ROI comprises identification features which allow the identification of a person in the operating room, the clinic or the hospital room, wherein the detecting comprises:
        generating a skin colour mask for said ROI representative for the skin region;
        generating a face region mask for said ROI representative for the face region; and
        generating a head region mask for said ROI representative for the face region;
    superimposing the skin colour mask, the face region mask, and the head region mask on each of the plurality of digital images; and
    anonymizing a region comprising at least a portion of the skin colour mask, the face region mask and the head region mask in the sequence of plurality of digital images; and
    outputting the anonymized video data.

2. The method according to claim 1, wherein the determining at least one ROI representative for the skin region comprises determining the ROI using skin colour detection for detecting a skin region.

3. The method according to claim 2, wherein the skin colour detection comprises:
    comparing pixel colour information of the plurality of pixels in a digital image with a predetermined colour range threshold;
    if the pixel colour information of a pixel of the plurality of pixels falls within the colour range threshold, generating said skin colour mask for said pixel.

4. The method according to claim 3, wherein comparing pixel colour information further comprises comparing a hue attribute of the pixel colour information of the plurality of pixels to a predetermined hue range threshold; and wherein the predetermined hue range threshold is 0° to 30°.

5. The method according to claim 1, wherein the determining at least one ROI comprises estimating a pose of at least one person in the operating room, the clinic or the hospital room.

6. The method according to claim 5, wherein the pose estimation comprises:
    determine one or more keypoints for the person in the digital image;
    matching the one or more keypoints to a predetermined point cloud representing a human pose; and
    estimating the pose of the person in the digital image based on the matching.

7. The method according to claim 5, further comprising outputting data relating to the estimated pose; and/or further comprising tracking variations of the pose estimation between digital images comprised in the sequence of digital images in the video data.

8. The method according to claim 5, further comprising:
identifying at least one keypoint (A1) corresponding to said head region of the person in the operating room, the clinic or the hospital room based on the estimated pose; and
generating said head region mask corresponding to the identified head region.

9. The method according to claim 5, wherein the determining at least one ROI comprises determining a ROI using skin colour detection for detecting said skin region, the method further comprising:
using the detected skin region and pose estimation to estimate said face region of the person;
generating said face region mask exclusively corresponding to the face region of the person based on the estimated pose and the detected skin region.

10. The method according to claim 1, wherein the determining at least one ROI comprises determining an ROI using facial recognition for detecting said face region; and generating said face region mask based on the detected face region.

11. The method according to claim 5, wherein the determining at least one ROI comprises determining a ROI using skin colour detection for detecting said skin region, the method further comprising:
using the detected skin region, face region and pose estimation to detect said face region of the person;
generating said face region mask exclusively corresponding to the face region of the person based on the detected skin region, face region and pose estimation.

12. The method according to claim 1, wherein the step of determining at least one ROI comprises a combination of at least two detections processes of:
skin detection including detecting skin colour for detecting said skin region;
pose detection including estimating a pose of at least one person in the operating room, the clinic or the hospital room, and;
facial detection including estimating said face region of the person,
wherein, in performing each of the detection processes, a respective sensitivity parameter is used for the respective detection process, wherein the sensitivity parameter of a first detection process is based on the detection result of a second detection process.

13. The method according to claim 12, further including the steps of:
detecting a ROI using a first detection process having a first sensitivity,
establishing that the ROI of the first detection process is not detected in a second detection process having a second sensitivity, and
increasing the sensitivity of the second detection process until the ROI as detected by the first detection process is detected.

14. The method according to claim 1, wherein each digital image of the sequence of plurality of digital images is anonymized; and/or wherein exclusively anonymized video data is output; and/or wherein the at least one ROI is traced between two or more digital images of the sequence of plurality of digital images.

15. The method according to claim 3, further comprising calibrating the video camera having video camera sensor values, wherein the calibrating comprises:
providing a calibration image having a predetermined calibrated colour information included on the calibration image;
obtaining at least one digital image of the calibration image using the video camera;
comparing video camera sensor values to the predetermined calibrated colour information of the calibration image;
adjusting the video camera sensor values based on the comparison such that a difference between the video camera sensor values and the predetermined calibrated colour information of the calibration image is reduced;
wherein the step of calibrating the video camera is intermittingly performed during the method.

16. The method according to claim 15, further comprising storing the obtained at least one digital image of the calibration image, and monitoring changes of the video camera sensor values with respect to the stored at least one digital image of the calibration image.

17. The method according to claim 16, further comprising obtaining location information of the video camera;
mapping the monitored changes of the video camera sensor values to the obtained location information;
storing the mapped changes and location information in a calibration database as mapping information; and
predicting changes of the video camera sensor values positioned on a location based on the stored mapping information; and adjusting the video camera sensor values based on the predicted changes.

18. A non-transitory digital storage medium encoding a computer-executable program of instructions for performing, when executed on by a computer, the method of claim 1.

19. A system for anonymizing video data in an operating room, a clinic or a hospital room, the system comprising
a video camera for obtaining video data, wherein the video data comprises a sequence of a plurality of digital images each comprising a plurality of pixels; and
a video processor configured to perform the method of claim 1.

* * * * *